United States Patent [19]
Wei et al.

[11] Patent Number: 5,229,948
[45] Date of Patent: Jul. 20, 1993

[54] METHOD OF OPTIMIZING A SERIAL MANUFACTURING SYSTEM

[75] Inventors: Kuang C. Wei, Grosse Pointe Farms; Norman C. Otto, Plymouth, both of Mich.

[73] Assignee: Ford Motor Company, Dearborn, Mich.

[21] Appl. No.: 611,215

[22] Filed: Nov. 3, 1990

[51] Int. Cl.$^5$ .............................................. G06F 15/46
[52] U.S. Cl. .................... 364/468; 364/402; 364/148
[58] Field of Search ............... 364/468, 148, 149, 150, 364/151, 152, 401, 402, 403, 478

[56] References Cited

U.S. PATENT DOCUMENTS

| | | |
|---|---|---|
| 4,604,718 | 8/1986 | Norman et al. |
| 4,710,864 | 12/1987 | Li |
| 4,744,027 | 5/1988 | Bayer et al. |
| 4,796,194 | 1/1989 | Atherton |
| 4,998,051 | 3/1991 | Ito .................................. 364/148 |
| 5,057,992 | 10/1991 | Traiger .............................. 364/148 |

OTHER PUBLICATIONS

Solberg, J. J., "A Mathematical Model of Computerized Manufacturing Systems", Proceedings of 4th International Conference on Production Research, Tokyo, Japan, Aug., 1977.

Stecke, K. E., "Production Planning Problems for Flexible Manufacturing Systems", PHD Thesis, Purdue University, West Lafayette, Indiana, 1981.

Gershwin, S. B., "An Efficient Decomposition Method for the Approximate Evaluation of Production Lines With Finite Storage Space", Proceedings of 23rd IEEE Conference on Decision and Control, Las Vegas, Nevada, Dec., 1984.

Buzacott, J. A., "Automatic Transfer Lines with Buffer Stocks", *The International Journal of Production Research*, vol. 5, No. 3, pp. 183-200, 1967.

*Primary Examiner*—Jerry Smith
*Assistant Examiner*—Thomas E. Brown
*Attorney, Agent, or Firm*—Joseph W. Malleck; Roger L. May

[57] ABSTRACT

A method of optimizing a multi-stage serial manufacturing system which includes: (a) providing a quantitative state-space model of said serial manufacturing system that describes processing in terms of sensitivity information and performance in terms of part production and storage/retrieval, said description using process switches in the form of buffer status indicators that express coupling between stages; (b) sensing new sensitivity information that results from simulating said manufacturing system with said model using estimated system performance information; and (c) adjusting said performance information by iteratively using said new sensitivity information in an optimization algorithm, said adjustment being carried out simultaneously with the simulation of step (b).

15 Claims, 3 Drawing Sheets

$$R^{i,j} = f^{i,j}(x^{i,j}, t, u^{i,j}) s^{i,j} \quad (1)$$

$$x^{i,j}_{n+1} = x^{i,j}_n + r^{i,j}_n s^{i,j}_n \text{DEL} \quad (2)$$

$$Ib^{i,j}_{n+1} = Ib^{i,j}_n + r^{i,j}_n s^{i,j}_n \text{DEL} + \text{JOUT}^{i,j} + g^{i,j} \quad (3)$$

$$Ob^{i,p}_{n+1} = Ob^{i,p}_n - r^{i+1,p}_n s^{i+1,p}_n \text{DEL} + \text{JIN}^{i,p} + g^{i,p} \quad (4)$$

$$g^{i,j} = BT_i \left( \sum_{\substack{k=1 \\ k \neq j}}^{Nm_i} \text{JIN}^{i,k} + \sum_{\substack{k=1 \\ k \neq j}}^{Nm_{i+1}} \text{JOUT}^{i,k} \right), BT_i = \begin{cases} 0 & B_i \text{ IS PARALLEL} \\ 1 & B_i \text{ IS CROSS-OVER} \end{cases}$$

$$\text{JOUT}^{i,k} = \mathcal{L}(Ob^{i,k}_n - r^{i+1,k}_n s^{i+1,k}_n \text{DEL}) - \mathcal{L}(Ob^{i,k}_n) \quad (5)$$

$$\text{JIN}^{i,k} = \mathcal{L}(Ib^{i,k}_n + r^{i,k}_n s^{i,k}_n \text{DEL}) - \mathcal{L}(Ib^{i,k}_n) \quad (6)$$

$$i = 1, 2, ..., N; \ j = 1, 2, ..., Nm_i; \ p = 1, 2, ..., Nm_{i+1};$$

a) FOR CROSS-OVER BUFFER $B_i$, $$\text{EMPTY}: B^i_n = \mathcal{L}(Ob^{i,k}_n) \leq 0 \quad \text{ANY } k \quad (7)$$

$$\text{FULL}: B^i_n = \mathcal{L}(Ib^{i,s}_n) \geq \beta \quad \text{ANY } s$$

b) FOR PARALLEL BUFFER $B_i$, $$\text{EMPTY}: B^{i,k}_n = \mathcal{L}(Ob^{i,k}_n) \leq 0 \quad \text{ANY } k \quad (8)$$

$$\text{FULL}: B^{i,s}_n = \mathcal{L}(Ib^{i,s}_n) \geq \beta^{i,s} \quad \text{ANY } s$$

$$s^{i,j}_n = \begin{cases} 0, & \text{IF } B^{i-1}_n \leq 0 \text{ OR } B^i_n \geq \beta^i \text{ FOR CROSS-OVER BUFFER, OR} \\ & B^{i-1,j}_n \leq 0 \text{ OR } B^{i,j}_n \geq \beta^{i,j} \text{ FOR PARALLEL BUFFER;} \\ 1, & \text{OTHERWISE.} \end{cases} \quad (9)$$

*Fig. 3*

$$\text{MIN } E[\text{FOBJ}(\beta^1, ..., \beta^i, ...)] = \underset{\beta^i}{\text{MIN }} E[\text{WGT} \times (\text{JPH} - \text{DJPH})^2 + \sum_{i=1}^{N-1} \beta^i] \quad (10)$$

*Fig. 4*

$$\beta^i_{min} \leq \beta^i \leq \beta^i_{max} \quad (11)$$

$$\frac{d}{d\beta^i} \text{OBJ}(\beta^1, ... \beta^i ...) = 2 \cdot \text{WGT} \times (\text{JPH} - \text{DJPH}) \cdot \frac{d}{d\beta^i} \text{JPH} + 1 \quad (12)$$

METHOD OF OPTIMIZING A SERIAL MANUFACTURING SYSTEM

BACKGROUND OF THE INVENTION

1. Technical Field

This invention relates to the art of modeling manufacturing systems, and more particularly to the art of developing analytical models for stochastic manufacturing systems and using such models to optimize process variables within the system.

2. Discussion of the Prior Art

In serial manufacturing systems, workpieces or goods flow through stages that are separated by storage spaces for temporary storage, referred to herein as buffers. Each stage comprises one or more machining operations, a robotically-generated task, or a task performed by human operation such as assembly or machining. Buffers can be either parallel or crossover. The crossover type is capable of storing and cross-feeding workpieces from any upstream stage to any downstream stage, and the parallel type can only store and feed workpieces from a single designated upstream stage to a designated downstream stage. Since each stage has its own cycle time, frequency of machine breakdown, and time required to repair, and each buffer has its own capacity, the flow of the system can be interrupted, starved, or blocked by any mismatches between stages.

The problem is to maximize the performance of such system, but its performance is governed by a combination of interrelated variables. Optimizing one variable without considering its interrelationship to the other variables leads to little or no improvement in performance. Thus, the maximization solution lies in finding the combination of variables under which the apparatus of the system meets a desired performance. Some of these variables are, of course, more controllable than others. So the degree of design freedom may be limited and constraints may exist even on the controllable variables. For example, with fixed cycle times, the design may involve determining the number of machines needed for each operation and, perhaps, subject to cost and space constraints. On the other hand, for a given set of breakdown/repair characteristics, optimization of the buffer size is of primary concern.

The first part of the problem is thoroughly understanding the behavior of the system by creating an accurate stochastic model that reflects the randomness of certain of the variables. The second part of the problem is to integrate the model with a method of rapidly determining values for process variables that meet a desired optimization objective. With respect to the first part of the problem, we must set apart prior art not related to continuous manufacturing systems as being irrelevant (such as in U.S. Pat. Nos. 4,710,864 and 4,604,718).

One of the earliest stochastic modeling approaches uses discrete event simulation which is based on logical descriptions of the system, devoid of math (see U.S. Pat. No. 4,796,194). While the discrete event simulation approach is capable of accurately modeling manufacturing systems, it does not lend itself to optimization. It is strictly an evaluation tool. Given a set of parameters, a simulation is run and the system's behavior and performance predicted. However, there is no mechanism, beyond trial and error based on the intuition of the user, for estimating how the parameters should be changed in order to achieve the desired objective.

Analytical models of manufacturing systems are attractive because they may offer "closed form solutions" which lend themselves to use with established optimization procedures. The term "analytical" refers to the fact that the system behavior is described by precise mathematical equations. Queuing models are included in this category (see the following articles: Solberg, J. J., "A Mathematical Model of Computerized Manufacturing Systems", Proceedings of 4th International Conference on Production Research, Tokyo, Japan, August, 1977; Stecke, K. E., "Production Planning Problems for Flexible Manufacturing Systems", PHD Thesis, Purdue University, West Lafayette, Ind., 1981. An analytical model based on decomposition and approximation was set forth in an article by Gershwin, S. B., "An Efficient Method for the Approximate Evaluation of Production Lines With Finite Storage Space", Proceedings of 23rd IEEE Conference on Decision and Control, Las Vegas, Nev., December, 1984. This latter model is limited by the number of machines and type of service distribution that it can handle and therefore is inadequate.

Finally, still another analytical modeling approach was set forth in Buzacott, J. A., "Automatic Transfer Lines with Buffer Stocks", *International Journal of Production Research*, 5, 3, pp. 183–200, 1967. The difficulty with these previous approaches is that they all place restrictions on the system behavior which limits their application to actual manufacturing systems. For example, queuing theory usually assumes a fixed arrival pattern of work to a server, while decomposition methods apply only to systems with a very small number of machines. Buzacott's work assumed infinite buffers and thus are inappropriate for optimizing buffer size.

With respect to the second part of the problem, the prior art is possessed of a variety of optimization procedures among which is included a simplex method, gradient search procedures, and trajectory methods (see U.S. Pat. No. 4,744,027). These methods were all developed for deterministic problems and can be set apart as inapplicable to stochastic problems. Deterministic problems are those which, for the same set of variable values, yield the same answer. Stochastic systems, however, have random components. In the absence of infinitely long simulation times (which are impractical), each run of the model can contain a different sequence of random events and give rise to different answers. In such systems, the objective function estimate becomes very "noisy" and parameter optimization quite difficult. It is difficult to ascertain how much of an observed change is due to the parameter change and how much is due to random "noise". Under such conditions, the aforementioned optimization methods perform poorly. The direction of the search is often mislead and convergence is poor, if it is even achieved at all.

SUMMARY OF THE INVENTION

To solve the problem of more effectively maximizing the performance of a serial manufacturing system, this invention has created a unique state-space model for a serial manufacturing system and also a procedure for rapid adjustment of such model's parameters in order to optimize the manufacturing system.

More particularly, the method of this invention of optimizing a serial manufacturing system, comprises: (a) providing a quantitative state-space model of the serial manufacturing system that describes processing in terms of sensitivity information and performance in terms of part production and storage/retrieval, said description using process switches in the form of buffer status indicators that express coupling between stages; (b) sensing new sensitivity information that results from simulating said manufacturing process with said model using estimated system performance information; and (c) adjusting said performance information by iteratively using said new sensitivity information in an optimization algorithm, said adjustment being carried out simultaneous with the simulation of step (b).

The above method automatically determines important parameter values which yield a system throughput close to the desired production rate and at the same time minimize the associated cost measure. In the case of determining storage space sizes, the cost measure is the total storage spaces. Since buffer space requirements are reduced by using the optimizer, this leads directly to improved system productivity. By maintaining minimum total storage space, the invention reduces the capital and inventory costs by reducing the unnecessary plant floor space and storage equipment due to excess storage space, thus increasing the efficiency of the system and manufacturing profitability. While buffer sizing is done as a part of facility planning and design, this method also can be applied to existing facilities by using the optimal buffer size values as targets for the levels of inventory that should be maintained. This will help achieve one of the major goals of just-in-time (JIT) production: the reduction of in-process inventory. The method also provides a rapid and easy to use design optimizer which can be implemented on any digital microcomputer.

The methodology of this invention is unique because it provides a concise state-space model to predict the performance of serial manufacturing systems and because the model is fast and accurate, and, unlike other existing analytical models, can handle systems with finite storage capabilities and arbitrary random components. The method of this invention is also unique because it provides a modular scheme to the scheduling and allocation of storage and workpiece resources.

The method also involves a new algorithm in optimizing the parameter design process for serial manufacturing systems, and is a self-adjusting scheme which automatically estimates buffer sizes required to yield a desired production rate under given random machine failure and repair conditions. Such methodology is generic and applicable to the design of other system parameters such as machine cycle time, down-time percentage, etc.

DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 3 is a listing of the basic equations of the state-space model utilized in the first part of the method of this invention;

FIG. 4 is a mathematical statement of the buffer size optimization problem; and

DETAILED DESCRIPTION AND BEST MODE

The invention herein uses an algorithm to automatically generate the optimal design of system parameters in serial manufacturing systems. The algorithm includes a mathematical model of the system and an optimization process. The model consists of a mathematical description of the machining process, the production process, and the storage/retrieval process, respectively. The optimization process uses an iterative method to search for the optimal parameter values based on the sensitivity information extracted from the model simulation data. Application to a storage space design problem is used as the best mode of the invention herein. The resultant design specifies a minimum total storage space required to achieve a desired system production rate.

The serial manufacturing system is a class of manufacturing systems widely used in the automotive industry, especially in machining lines. It can be a single-input-single-output (SISO) system, or the more general, more complicated, multiple-input-multiple-output (MIMO) system.

It is first necessary to create a state-space math model of the general serial manufacturing system which includes the machining rate and buffer stock as part of the state vector. This allows tracking of the machine status and work-in-process (WIP). There are difficulties in modeling a MIMO system, such as the strong coupling among buffer input processes, the cross-coupling between input and output processes, and the embedding of an operating rule into the model.

A MIMO manufacturing system (as shown, in part, in FIG. 1) consists of a series of N multiple machine operations, or stages, separated by storage buffers. In this configuration, $B_i$ is the i-th buffer, feeding material to stage i+1 and accepting material from stage i, where i=1,2,3 . . . , N. Let $B_0$ be the input buffer at the beginning of the production line. Allowing multiple machines within a stage provides alternate resources for performing a given processing task. Thus, $M_{i,j}$ is the j-th station, or machine, in the i-th stage with j=1,2,...,$Nm_i$=number of machines in the i-th stage. The configuration shown in FIG. 1 can be used to represent a wide range of manufacturing systems. While the discussion below refers to application to conventional machining transfer lines, it could equally apply to an assembly line if one assumes the assembly operation can be treated the same mathematically as a machining operation.

Figure 1:
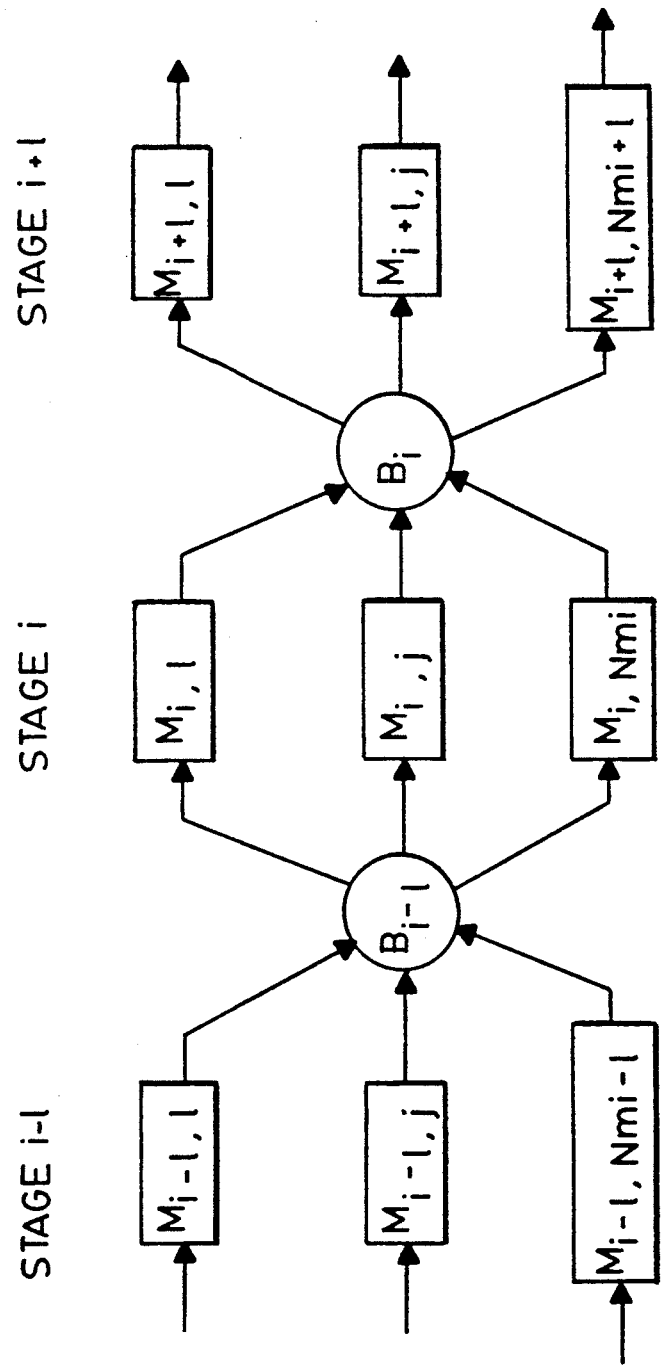
FIG. 1 is a schematic diagram of a multiple input, multiple output serial manufacturing system employing the principles of this invention.
Figure 5:
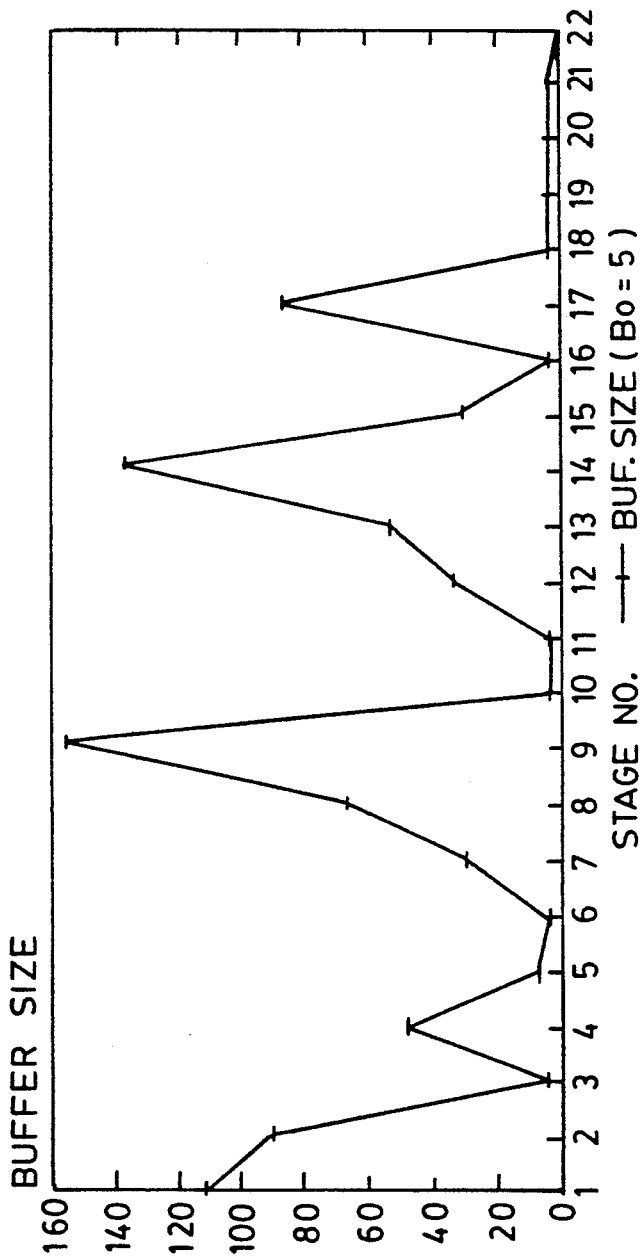
FIG. 5 is a plot of estimated optimal buffer size as a function of the process stage for a multiple input, multiple output serial manufacturing system.
Figure 2:
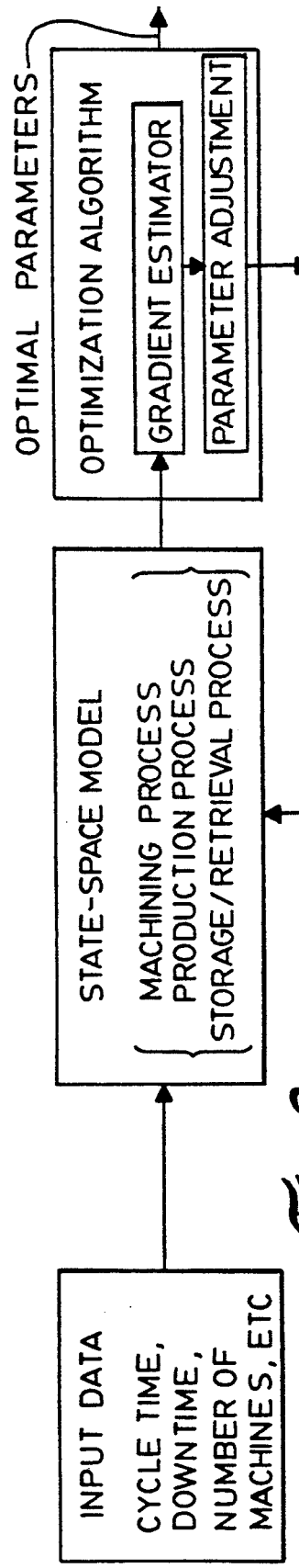
FIG. 2 is a functional block diagram of the method aspects of this invention.

The performance of the serial manufacturing system depicted in FIG. 1 is governed by a number of variables, including cycle time, buffer capacities, processing resources, the frequency of machine breakdown and the time required for repair. The problem is to find a combination of variables under which the system meets the desired performance. Until this invention, no systematic means of quantitatively estimating the parameter searching has been available.

Two types of buffers are commonly seen in the production lines, namely, crossover and parallel. In the former case, workpieces from any upstream machine can feed any downstream machine. Consequently, the total buffer space is available for each machine. In the latter case, workpieces from a given upstream machine can only feed one specific downstream machine via a set of parallel sub-lines. Thus, in the parallel case, the single buffer of FIG. 1, $B_i$, can be thought of as a set of multiple sub-buffers, $B_{i,j}$, which are disjoint to each other. Each sub-buffer can only receive parts from a designated upstream machine and feed into a designated downstream machine. It should be mentioned that, for a crossover buffer, the number of upstream machines not be the same as the number of downstream machines. However, a parallel buffer must, by definition, have the same number of upstream and downstream machines.

In a state-space model, a set of state variables, characterizing the dynamic behavior of a given system, are chosen. For example, in a second-order, mass-spring mechanical system, the position and velocity of the mass can be chosen as the state variables of the system. The relationship between input (external force acted upon the mass) and output (position of the mass with respect to certain coordinate system) can then be described by a set of differential or difference equations in terms of these state variables. The advantage of this approach is that it provides a succinct form for representing the dynamics of the system. The resulting model is then amenable to extensive mathematical analysis of the basic properties of the underlying system and can be used for system design and the development of control strategies. The differential equations for the state-space MIMO model are presented in FIG. 3.

Due to the physical limit of the storage capacity, the storage/retrieval process introduces a saturation type of nonlinearity to the system. Even though most of the system equations are linear, as shown in FIG. 3, it is the saturation phenomenon (which cannot be linearized) that makes the task of solving them analytically very difficult, if not impossible. This is why many analytical modeling approaches neglect this effect. Yet, the saturation phenomenon, referred to commonly as blocking, cannot be neglected because it can have drastic influence on system performance.

A serial manufacturing system is controlled by three dynamic processes, the machining process, the production process, and the storage/retrieval process. The former two are active processes in which workpieces are being processed in some manner, e.g., machined, painted, assembled, etc. The latter one is a passive process in which workpieces simply pass to or from a storage space without being "worked" on. The modeling of each of these processes is discussed individually in the remainder of this section. A fourth process, material handling or the transport of material between operations and buffers, is not explicitly considered in this formulation of the model. By neglecting this process, the assumption is that the travel time between stages is small relative to the processing times.

Let $R^{i,j}$ be the processing rate of each machine and $x^{i,j}$ be the total number of workpieces produced by that machine. The processing rate $R^{i,j}$ can be expressed as the product of two functions, f and s, $$R^{i,j} = f^{i,j}(x^{i,j}, t, u^{i,j}) s^{i,j} \quad (1)$$

The function $f(.,.,.)$ is a general, nonlinear machining function that gives the processing rate uninfluenced by the material flow dynamics of the system. That is, the rate assuming an adequate supply of both workpieces to process and storage spaces for the output. This machining function can be constant, vary continuously with time under the influence of control variable u, or be set to zero at discrete times to reflect machine breakdown, tool changes, or scheduled breaks. In general, $f(.,.,.)$ may vary from machine to machine and thus the superscripts (i,j) are included. The material flow dynamics of the system are reflected by a switching function $s(.,.)$ which can be considered to be a machine status indicator with values defined by $$s^{i,j} = \begin{cases} 0 & \text{if } B_{i-1} \text{ empty, or, } B_i \text{ full} \\ 1 & \text{otherwise.} \end{cases} \quad (2)$$

The mathematical definition of the terms "empty" and "full" as well as the evaluation of the function $s(.,.)$ will be discussed at the end of this section.

Let us assume that there is only one type of workpiece processed by the system. Then, by definition of the processing rate and the number of workpieces produced, the production process for each machine is described by the following first-order differential equation:

$$\frac{d}{dt} x^{i,j} = R^{i,j} \quad (3)$$

Substitution of Eqn. (1) into Eqn. (3) yields $$\frac{d}{dt} x^{i,j} = f^{i,j} s^{i,j} \quad (4)$$

The integration of Eqn. (4) is complicated by the fact that both $s(.,.)$ and $f(.,.,.)$ may be discontinuous functions with the discontinuities occurring at unknown times. To allow for periodic updates of these functions to account for the discontinuities, Eqn. (4) is integrated stepwise using equal time increments of size DEL. We assume that, over DEL, $f(.,.,.)$ may be replaced by its average value, f, and $s(.,.)$ remains unchanged. With these assumptions, we can find by successive integration, the pieces produced at time $t_{n+1}$, $$x^{i,j}_{n+1} = x^{i,j}_n + f^{i,j} s^{i,j}_n DEL \quad (5)$$

where $t_{n+1} = (n+1) DEL$ and the subscript n has been added to indicate the time step. Certainly, the approximations involved in obtaining Eqn. (5) become better as the time increment size DEL becomes smaller. In any case, it is assumed that (for all i,j,n) DEL is small enough such that only a fraction of a workpiece is completed in DEL, i.e., $$f^{i,j} DEL \leq 1 \quad (6)$$

This assumption greatly simplifies the tracking of the buffer stocks and allocation of the available resources. Finally, to further simplify, we will assume that the machining function is equal to a constant, $r^{i,j}$, over the time step, so that Eqn. (5) becomes, $$x^{i,j}_{n+1} = x^{i,j}_n + r^{i,j} s^{i,j}_n DEL \quad (7)$$

where the value of $r^{i,j}$ will either be the nominal machining rate or zero, if the machine is broken down.

Although production is modeled as a continuous process, most measures of performance are, in fact, available only at discrete points in time and in terms of integer quantities of workpieces. Thus, the quantity $x^{i,j}$ $n$ can be viewed as the "augmented" production at time $t_n$, consisting of the "whole" number of workpieces produced by $M_{i,j}$ (the integer portion of $x^{i,j}{}_n$) and the fraction of the workpiece currently being processed that has been completed so far (the fractional portion of $x^{i,j}{}_n$) Because of these considerations, it is convenient to define the lower integer (or truncation) operator $\zeta$. The lower integer operator $\zeta$ is a mapping from the real axis R to the integer axis I, defined as follows:

$$L(.): R \rightarrow I \tag{8}$$
and
$$x - 1 \leq L(x) \leq x, \quad \text{if } x \neq 0$$
$$L(x) = 0, \quad \text{if } x = 0$$

Thus, $\zeta(x^{i,j}{}_n)$ gives the output or production of machine $M_{i,j}$ at time $t_n$.

Machining operations in a serial manufacturing system are strongly coupled. If one machine stops processing, its neighboring machines, both upstream and downstream, may soon be affected. The downstream machine may run out of new workpieces and be forced down (idle) to wait for new workpieces. This is known as starving. On the other hand, the upstream machine may run out of storage places for workpieces and be forced down to wait for new space. This is known as blocking. This kind of coupling is not very desirable because the idling by starving or blocking of an otherwise "healthy" machine, especially if it is the bottleneck operation, could adversely affect the throughput of the system. One way to reduce this coupling is to use a buffer as a temporary storage space between operations.

As long as a buffer $B_i$ is not full, i.e., storage spaces are still available, the corresponding upstream and downstream machines are output decoupled. In other words, the upstream operation is not affected by the (down) status of the downstream machine because it can still output workpieces to $B_i$. However, once a buffer becomes full, its upstream and downstream machines will be tightly coupled again. Similarly, if the buffer is not empty, the corresponding upstream and downstream machines are input decoupled. That is, the downstream machine is not affected by the (down) status of the upstream machine because it can still input a workpiece from $B_i$. Since its size is finite, a buffer always has the possibility of becoming full. Likewise, since a buffer is only a passive storage device and cannot produce workpieces by itself, it always has the possibility of becoming empty. Hence, the inclusion of buffers only reduces the coupling between machines, it does not necessarily eliminate it completely. By choosing proper sizes for the buffers based on known machining processing (cycle) times and breakdown statistics, the coupling can be significantly reduced and thus the efficiency of the system greatly improved.

The coupling between machines is very well represented by the machine status indicator $s(.,.)$ in Eqns. (1)–(2). In order to appropriately adjust the machine status indicators, $s(.,.)$, the contents of the buffers must be tracked so that the "full" and "empty" conditions can be detected. Before detailing the mathematics of these buffer dynamics, it is instructive to discuss the methods chosen for expressing buffer contents.

To describe the contents of a buffer, we use a convention that both separates the incoming and outgoing material flow and distinguishes between the effects of individual machines. We define the variable $Ib^{i,s}$ to be the "augmented" input stock in buffer $B_i$ attributable to upstream machine $M_{i,s}$. Again, "augmented" is used to indicate that the fractional part of $Ib^{i,s}$ is the portion of the current workpiece completed so far on the upstream machine $M_{i,s}$. The fractional portion is called an output reserved fractional stock (o.r.f.s.). It represents a way of reserving space in the buffer once the upstream machine starts machining a new workpiece. This reserve takes a value of zero when machining of a new workpiece begins and increases to one at a rate given by $r^{i,s}$. Upon completion of that workpiece, the o.r.f.s. reverts back to zero. The integer portion of $Ib^{i,s}$ is defined slightly differently for parallel and crossover buffers. For parallel buffers, where the "origin" of whole workpieces residing in buffers must be known, the integer portion of $Ib^{i,s}$ includes only those workpieces produced by upstream machine $M_{i,s}$. For crossover buffers, where origin is irrelevant, it equals the total number of whole workpieces regardless of where they were produced. In either case, upon completion of a workpiece by $M_{i,s}$, the integer portion of $Ib^{i,s}$ increases by one.

Similarly, on the output side, we can define $Ob^{i,k}$ as the "augmented" output stock in the buffer. Here, the fractional portion of the output stock is the uncompleted portion of the current workpiece left to be processed by downstream machine $M_{i,k}$. The fractional portion is referred to as the input reserved fractional stock (i.r.f.s.) because it is the fraction of a workpiece which is reserved for the downstream machine. This reserve starts with a value of one and decreases at a rate $r^{i+1,k}$, reaching zero as the machining of that workpiece is completed. As with the input stock, the integer portion is the number of whole workpieces currently residing in the buffer either total (crossover) or produced by upstream machine k (parallel).

For parallel buffers, since there is no coupling between different machines within the same stage, the dynamic behavior of the buffer stock variables can be expressed rather simply. The value of $Ib^{i,j}$ is affected only by its upstream and downstream machine. Thus, we can describe the contents of buffer $B_{i,j}$, at time $t_{n+1}$, by $$Ib^{i,j}{}_{n+1} = Ib^{i,j}{}_n + r^{i,j} s^{i,j}{}_n DEL + [\zeta(Ob^{i,j}{}_n - r^{i+1,j} s^{i+1,j}{}_n DEL) - \zeta(Ob^{i,j}{}_n)] \tag{9}$$

$$Ob^{i,j}{}_{n+1} = Ob^{i,j}{}_n - r^{i+1,j} s^{i+1,j}{}_n DEL + [\zeta(Ib^{i,j}{}_n + r^{i,j} s^{i,j}{}_n DEL) - \zeta(Ib^{i,j}{}_n)] \tag{10}$$

The total buffer contents is given by $$B_n^i = \sum_{k=1}^{Nm_i} L(Ib^{i,k}) = \sum_{k=1}^{Nm_{i+1}} L(Ob^{i,k})$$

The formulation is again completed by defining mathematically the meaning of the terms "empty" and "full". This allows evaluation of the machine status indicator, s, thus:

If $\zeta(Ob^{i,k}) = 0$, then sub-buffer k is empty and
$s^{i+1,k} = 0$;

If $\zeta(Ib^{i,k}) = b^{i,k}{}_{max}$, then sub-buffer k is full and
$s^{i,k} = 0$. \tag{11}

In the parallel case, the capacities of each sub-buffer k ($b^{i,k}{}_{max}$) must be specified individually. For crossover buffers, the dynamic behavior of these buffer stock variables is more complex.

These variables demonstrate two distinct types of behavior, namely, the continuous change associated with the variables' "own" machine and the discrete changes (or jumps) that occur when a workpiece is added to or removed from the buffer by "another" machine. Thus, $Ib^{i,l}$, for example, increases smoothly with a slope of $r^{i,l}$ with jumps of $-1$ occurring whenever $M_{i+1,l}$ begins processing a new workpiece and jumps of $+1$ whenever $M_{i,2}$ finishes a workpiece. Note that the jumps are a direct consequence of defining the integer portion of all buffer stock variables to be the total number of workpieces in the buffer. Thus, the buffer contents at any time $t_n$, $B^i{}_n$, are given by $$B^i{}_n = \zeta(Ib^{i,s}{}_n) = \zeta(Ob^{i,k}{}_n), \text{ any } s \text{ or } k \qquad (12)$$

Looking first at the dynamics of the input buffer stock, the behavior can be expressed mathematically by $$Ib^{i,j}_{n+1} = Ib^{i,j}_n + r^{i,j} s^{i,j}_n DEL + JOUT^{i,j} + \qquad (13)$$

$$\sum_{\substack{k=1 \\ k \neq j}}^{Nm_{i+1}} JOUT^{i,k} + \sum_{\substack{k=1 \\ k \neq j}}^{Nm_i} JIN^{i,k}$$

where the jumping functions JOUT and JIN are defined as $$JOUT^{i,k} = \begin{cases} -1, & \text{if output jump from } B_i \text{ to machine } M_{i+1,k} \\ 0, & \text{otherwise;} \end{cases} \qquad (14)$$

$$JIN^{i,k} = \begin{cases} 1, & \text{if input jump to buffer } B_i \text{ from machine } M_{i,k} \\ 0, & \text{otherwise.} \end{cases} \qquad (15)$$

Clearly, the jumping functions are used to express the coupling of both the other input and output processes to a given buffer input stock variable. Evaluation of the jumping functions follows directly from the fact that the contribution of each machine is tracked individually. Thus, an input jump to buffer $B_i$ from upstream machine $M_{i,k}$ is indicated whenever the fractional portion of $Ib^{i,k}$ reaches one. Similarly, an output jump caused by a downstream machine $M_{i,k}$ is signaled by the fractional portion of $Ob^{i,k}$ reaching zero. Thus, using the lower integer operator $\zeta$, defined previously, the jumping functions can be written as $$JOUT^{i,k} = \zeta(Ob^{i,k}{}_n - r^{i+1,k} s^{i+1,k}{}_n DEL) - \zeta(Ob^{i,k}{}_n) \qquad (16)$$

$$JIN^{i,k} = \zeta(Ib^{i,k}{}_n + r^{i,k} s^{i,k}{}_n DEL) - \zeta(Ib^{i,k}{}_n) \qquad (17)$$

Likewise, we may write an analogous equation for the output buffer stock variable $$Ob^{i,j}_{n+1} = Ob^{i,j}_n - r^{i+1,j} s^{i+1,j}_n DEL + JIN^{i,j} + \qquad (18)$$

$$\sum_{\substack{k=1 \\ k \neq j}}^{Nm_{i+1}} JOUT^{i,k} + \sum_{\substack{k=1 \\ k \neq j}}^{Nm_i} JIN^{i,k}.$$

While the methods chosen for describing and tracking buffer contents may not be the intuitive choices, they offer several advantages. First of all, by considering both Ib and Ob, the effects of input and output flow can be modeled and monitored separately and the coupling between the processes tracked easily and explicitly. In addition, defining the integer portion of all buffer stock variables to be the total buffer contents is consistent with the concept of a crossover buffer, where both material and storage space are equally accessible to all machines, both upstream and downstream of the buffer.

The formulation of the model is completed by mathematically expressing the meaning of an "empty" and "full" crossover buffer, $$\text{Empty: } B^i{}_n = \zeta(Ob^{i,k}{}_n) = 0 \text{ any } k$$

$$\text{Full: } B^i{}_n = \zeta(Ib^{i,s}{}_n) = b^i{}_{max} \text{ any } s \qquad (19)$$

where $b^i{}_{max}$ is the maximum number of workpieces allowed in the buffer (i.e., the capacity). This then allows the machine status function indicator to be specified, $$s^{i,j}_n = \begin{cases} 0, & \text{if } B^{i-1}_n = 0 \text{ or } B^i_n = b^i_{max} \\ 1, & \text{otherwise.} \end{cases} \qquad (20)$$

To summarize in more formal notation, by defining a state vector $$\Gamma^i{}_n = [..x^{i,j}{}_n..Ib^{i,s}{}_n..Ob^{i,k}{}_n..R^{i,j}{}_n..]^T,$$

and an external input vector $$U^i{}_n = [..u^{i,j}{}_n..]^T \text{ for the i-th stage } (i=1,2,..N),$$

we have the following state equations which characterize the dynamics of a N-stage MIMO manufacturing system:

$$\Gamma^i_{n+1} = A_n^i \Gamma_n^i + G^i(\Gamma_n^i, \Gamma_n^{i+1}, U_n^i, n) \qquad (21)$$

$\Gamma_n^i$: $(3 Nm_i + Nm_{i+1}) \times 1$ vector
$A_n^i$: $(3 Nm_i + Nm_{i+1}) \times (3 Nm_i + Nm_{i+1})$ matrix
$G^i(.)$: $(3 Nm_i + Nm_{i+1}) \times 1$ nonlinear vector function
$U_n^i$: $Nm_i \times 1$ vector of external inputs (controls)

where $A^i$ and $G^i(.)$ are defined by Eqns. (1), (7), (9)–(11), (13)–(18).

The model presented above, through use of the machine status indicator $s(.,.)$, clearly allows for the stoppage of processing due to the lack of either workpieces to process (starving) or space in the buffer to store machine output (blocking). However, the manner in which these two phenomena are controlled (i.e., turned on and off) deserves further discussion.

In particular, two areas are of interest. The first deals with the timing of a starving or blocking event. By choosing to integrate the model equations in equal time steps (with function evaluation at the beginning of the step), it is highly likely that the step changes in the $s(.,.)$ function value caused by starving or blocking will be missed. Thus, we must have some means of detecting whether a starving or blocking event will occur during a time step and, if it does occur, a method for properly accounting for it. The second area of interest deals with the question of machine contention for the crossover buffer case. Contention is an issue if more than one machine is starved (blocked) for lack of a workpiece (storage space) and thus an allocation decision must be made when that workpiece (storage space) does become available.

Consider first the onset of starving and blocking. To determine whether starving or blocking will occur during a given time step requires that a comparison be made between the resource demand and the resource availability. In the discussion that follows, the term "resource" refers to either a workpiece in the upstream buffer of a machine or a storage space in the downstream buffer. A machine requires each before processing of a new part can begin. The resource demand will be made up of any machines already starved or blocked plus those machines which complete processing of a workpiece during the time interval. Because the fractional parts of the buffer stock variables give the extent of processing on each machine, workpiece completion is easily determined. Specifically, referring again to the notation of FIG. 1, for each machine $M_{i,j}$ of stage i, the time at which the current workpiece will be completed, denoted by $CT^{i,j}$ can be calculated based on the output stock of the upstream buffer $Ob^{i,j}$. That is, $$CT^{i,j} = \frac{Ob_n^{i,j} - L(Ob_n^{i,j})}{r^{i+1,j}} \quad (22)$$

Note that if a machine is in a starved or blocked state, then $Ob^{i,j}_n$ equals $\zeta (Ob^{i,j}_n)$ and by Eqn. (22) $CT^{i,j}=0$. If one views the completion time as the time until the next demand for a resource, then this definition is also consistent for machines that are already blocked or starved.

The total resource demand for a stage, $ND_i$, is then obtained by simply counting the number of machines for which $$CT^{i,j} \leq DEL \quad (23)$$

Clearly, this will include all machines currently starved or blocked as well as those that will complete a part within DEL and thus require both a workpiece from the upstream buffer and a storage space in the downstream buffer to proceed.

The resource availability for stage i, $NA_i$, will be limited by the lower of either (i) the workpieces residing in the upstream buffer or (ii) the available storage space in the downstream buffer. Thus, $$NA_i = min (B^{i-1}_n, b^i_{max} - B^i_n) \quad (24)$$

It should be pointed out that by defining $NA_i$ in this manner we ignore, at least for the moment, any additional resources that might become available during the time interval due to workpiece completion by another upstream or downstream machine.

If the resource availability equals or exceeds the resource demand, then, of course, no starving or blocking will occur and all $s^{i,j}$ are set to one for the next interval. If this is not the case, then the available resources must be assigned. This allocation decision process is described in detail later in this section. For now, suffice it to say that a prioritized list of machines needing resources during the time step is available. Thus, the available resources as calculated in Eqn. (24) are assigned to the first $NA_i$ entries on this list. The remaining ($ND_i$-$NA_i$) machines will be starved or blocked unless additional resources become available during the time step. To determine whether this occurs, we need to look at the completion times of the up and downstream machines. The additional resources are given by:

$NS_i$ = # of additional storage spaces

= # of k with $0 < CT^{i+1,k} \leq DEL$ $NW_i$ = # of additional workpieces

= # of k with $0 < CT^{i,k} \leq DEL$.

The final step in the procedure is to match the times at which the additional resources become available against the time when the resource is needed. The new resources are allocated in order of their appearance (i.e. $CT^{i+1,k}$ or $CT^{i-1,k}$) to machines in order of their position on the prioritized allocation list. If the resource becomes available before the machine to which it is allocated completes its workpiece, then processing proceeds uninterrupted. If workpiece completion occurs first, the machine will be idle until the resource becomes available. Finally, if excess demand still exists after all the additional resources are taken into account, the remaining machines will remain idle for the rest of the time interval.

To reflect the fact that processing occurs for only a portion of the time step, the DEL terms in the model equations are replaced by DT, defined as follows:

$CT^{i,j}+(DEL-CT^{i-1,k})$, if workpiece resource available at $CT^{i-1,k}$;

$DT = CT^{i,j}+(DEL-CT^{i+1,k})$, if storage resource available at $CT^{i-1,k}$;

$CT^{i,j}$, (25)

if no resource available.

Whenever more than one machine is competing for a resource, this contention must be resolved. Here we address the question of how the prioritized list of machines mentioned above is generated. The means by which contention is resolved is often a matter of choice with such choice forming a system operating rule. Some common options include using fixed (static) priorities, shortest processing time, and longest waiting time. To illustrate how a specific operating rule might be implemented, we present the case of a longest waiting time (LWT) rule.

To determine resource allocation, we first calculate for each machine included in $ND_i$, the waiting time, WT, defined as follows: (initially $WT^{i,j}=0$)

$$WT^{i,j} = \begin{cases} DEL + WT^{i,j}, & \text{if } CT^{i,j} = 0 \\ DEL + CT^{i,j}, & \text{if } CT^{i,j} > 0 \end{cases} \quad (26)$$

The machines are then ranked in order of increasing waiting time value, the greater the value the higher the ranking. In the event of equal waiting times, the machine $M_{i,j}$ with a lower j value will be assigned a higher ranking. Clearly, the longer a machine remains starved or blocked, the larger the WT value becomes and the higher the priority. Perhaps not so obvious is the fact that this ranking scheme also imposes some additional priorities; namely, that resources will always be allocated to machines that are already down in preference to those that will be completing a part during the time step, and that among machines completing a workpiece during a step, demands are satisfied as they arise.

This can be summarized by outlining the algorithm that is executed at each time interval in order to account for blocking, starving, and machine contention. For each stage i, at time $t_n = n$ DEL, the status function of the individual machines is calculated as follows:

1. Using Eqns. (22)–(23), the completion time of each machine is calculated and the resource demand $ND_i$ found. For any machine $M_{i,j}$ not included in the set $ND_i$, set $s^{i,j} = 1$.

2. Using Eqn. (24), calculate $NA_i$. If $NA_i \geq ND_i$, then no starving or blocking will occur and all machines that require a resource will receive one. To reflect this, set $s^{i,j} = 1$ for all j in $ND_i$. If $NA_i < ND_i$, proceed to step 3.

3. Calculate the waiting time by (26) and rank the $ND_i$ machines using the LWT rule as outlined above.

4. For the highest $NA_i$ ranking machines, set $s^{i,j} = 1$. For the remaining $(ND_i - NA_i)$ machines, check possible matching with either upstream or downstream incoming resources. If a new upstream or downstream resource becomes available before $M_{i,j}$ completes the current workpiece, set $s^{i,j} = 1$. Otherwise, set $s^{i,j} = 1$ and replace DEL in the model equations with DT according to Eqn. (25). For those machines with zero CT and no resource allocated, $s^{i,j}$ remains zero.

It should be noted that if a different operating rule is desired, it can be easily implemented into the model by modifying Step 3 with the new rule. The remaining steps would be the same.

As indicated above, buffers are usually provided between operations as temporary storage spaces for excess parts. When a buffer becomes empty (full), its corresponding upstream and downstream machines are input (output) coupled. This means, if the upstream (downstream) machine breaks down, it will idle the downstream (upstream) machine due to shortage of parts (storage spaces) and the performance of the entire system may be degraded. The efficiency of such a system can be increased by providing large buffers between consecutive operations. Yet, large buffers come at the cost of increased space requirements, more inventory, and a greater material handling task. Thus, it would be desirable to have a systematic means of estimating the buffer sizes needed to meet the system performance goals while minimizing the cost.

This buffer design problem can be formulated as an optimization problem.

$$\underset{\beta^i}{\text{Min}} E[OBJ(\beta^1, \ldots, \beta^i, \ldots)] = \quad (27)$$

$$\underset{\beta^i}{\text{Min}} E\left[ WGT \cdot (JPH-DJPH)^2 + \sum_{i=1}^{N-1} \beta^i \right]$$

where
JPH: job (parts) completed per hour for the given system,
DJPH: the desired JPH,
WGT: weighting coefficient,
E[.]: the expected value, or mean, of a random variable.

The objective function OBJ $(..,\beta^i,..)$ is made up of two parts. The first term represents a measure of the deviation of the actual JPH from a desired throughput DJPH. The second term represents the total number of storage spaces in the system. By minimizing the objective function OBJ, the goal of yielding the desired throughput DJPH with a minimum total buffer size can be achieved. All buffers are subject to the following capacity constraints which reflect either some operational requirements or physical limits to storage space:

$$\beta_{min} \leq \beta^i \leq \beta_{max}$$

Due to lack of a closed form representation of the actual throughput (JPH) in terms of the decision variables $\beta^i$, one must resort to either simulation or the actual production data to evaluate the objective function OBJ. A single run sampling is used here to improve the efficiency of sampling and optimization procedure for dynamic systems.

In the single run procedure, a single, long simulation run, instead of multiple replicate runs, is made. At prespecified time intervals during the simulation run, the objective function is calculated, or observed, and used to update the decision variables. After each update, the simulation resumes from the state it was in at the time of the update, but now using the new parameter values.

Because the underlying system is ergodic, the mean value of the objective function obtained by averaging along the time axis will be the same as the ensemble average over multiple replication runs as long as the time under consideration is sufficiently long. In single run optimization, observations are made along a long simulation run and parameters are updated along the observation intervals. This, in essence, is equivalent to averaging the observed functional values along the time axis.

The main advantage of the single run procedure is that the bias introduced by initial transients can be greatly reduced. This is because each observation interval restarts from a "warmed-up" system (parts residing in the buffers from a previous observation interval are carried over as initial conditions for the next observation interval), while in the traditional ensemble procedure, each observation interval starts from a "cold" system (in which all intermediate buffers are initially empty). Depending on the cycle times and number of operations, it may take a good amount of lead time to fill up the "cold" empty system. The atypical behavior encountered during this period appears as bias in the objective function estimate. In the single run procedure, only one such initial transient is encountered and as a result a better quality (less biased) estimate of the mean objective function can be expected. Thus, all studies reported here were done using single run sampling.

An optimization algorithm is developed to find the optimal buffer sizes. The algorithm consists of two parts. The first part computes the gradient estimate of the objective function with respect to each buffer size. The second part uses the gradient estimate in a iterative procedure to compute optimal buffer size estimates. The iterative procedure is performed based on observation from a single simulation run, instead of traditional multiple runs to get an ensemble average of the performance measure which provides tremendous savings in computation time.

The gradient of the objective function with respect to each buffer size, $DOBJ/dB^i$, can be computed from the gradient of JPH with respect to each buffer size, $DJPH/dB^i$, shown as follows:

$$\frac{d}{d\beta^i} OBJ(\beta^1, \ldots \beta^i \ldots) = \tag{28}$$

$$2 \cdot WGT \cdot (JPH\text{-}DJPH) \cdot \frac{d}{d\beta^i} JPH + 1$$

A finite perturbation analysis procedure is used to calculate the gradient estimate. Whenever a part leaves an operation, we analyze what would happen if the buffer capacity were increased by one part. Any additional parts produced, due to this 1 unit increase of $\beta^i$, divided by the time interval of consideration. The additional parts produced are referred to as "part" gain, while the additional storage space thus generated is referred to as "hole" gain. The part gain and hole gain move either downstream or upstream in the production line depending upon the status of the buffers. A part gain cancels a hole gain generated by the same buffer whenever they meet. The total number of additional parts produced, referred to as the line gain, is obtained by summing up all part gains which are generated by this change and moved to the end of the production line. This analysis is applied to all buffers during a simulation run. At the end of each simulation run, the line gain for each buffer $B_i$ is used to compute the gradient estimate $DOBJ/dB^i$ according to Eqn. (28). The gradient estimate is then used to adjust the buffer sizes and the simulation run continued for another time interval which generates a new gradient estimate. This procedure is repeated until the gradient estimate is sufficiently small indicating the buffer sizes are optimal.

Using perturbation analysis to estimate the gradient has proven to be much more efficient than other methods. A much more reliable estimate is obtained resulting in a more stable convergence of the optimization procedure.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of optimizing a multi-stage serial manufacturing system, comprising:
   (a) providing a quantitative state-space model of said serial manufacturing system that describes processing in terms of stages, sensitivity information for blocking or starving of such stages, and performance information in terms of part production and buffer storage/retrieval, said description using process switches in the form of buffer status indicators that express coupling between stages;
   (b) using estimated performance information, including buffer size, to simulate said manufacturing system with said model and sensing new sensitivity information that results therefrom; and
   (c) concurrently adjusting said performance information, including buffer size, by iteratively using said new sensitivity information in an optimization algorithm to estimate a gradient of the performance information with respect to buffer size and thence adjust buffer size, and repeating steps (b) and (c) until the gradient substantially stabilizes.

2. The method as in claim 1, in which said serial manufacturing system is subject to random effects or variable multiple inputs accompanied by multiple random outputs.

3. The method as in claim 1, in which said state-space model is a set of mathematical quantitative equations expressing the dynamic behavior of the serial manufacturing system.

4. The method as in claim 3, in which said state-space model expresses coupling between buffer input processes, cross-coupling between input and output processes, and embedding of an operation rule to resolve contention issues.

5. The method as in claim 1, in which in step (a) processing is characterized as a function of cycle rate, time, buffer status indicator as well as workpieces being produced.

6. The method as in claim 5, in which said processing can vary linearly or discontinuously.

7. The method as in claim 1, in which in step (a) said part production is the sum of total pieces at one previous instant added to the fractional workpieces at a current instant time.

8. The method as in claim 1, in which in step (a) said storage/retrieval is a set of cross-coupled equations describing input stock and output stock.

9. The method as in claim 8, in which the input stock is equal to the sum of whole stock from previous stages added to the fractional stock completed upstream to be entered, added to the whole stock just out, added to the other sources or sinks of whole stock.

10. The method as in claim 8, in which said output stock is the sum of the whole stocks from previous stages, less fractional stock yet to be completed by the downstream machine, but added to the whole stock just in, and added to the other sources or sinks of whole stock.

11. The method as in claim 1, in which in step (a) said buffer status indicator is equal to the value of zero, if the buffer is empty or full, and equal to the value of one, otherwise.

12. The method as in claim 1, in which in step (b) said sensitivity information is a proposed change in system performance variables in response to changes in processing parameter values.

13. The method as in claim 1, in which said selected production rate is comprised of a minimum rate defined in terms of per hour/per shift.

14. The method as in claim 1, in which in step (b) said buffer space is the space for inventory between stages and can be either of the crossover type or parallel type.

15. The method as in claim 1, in which in step (c) said gradient estimator is used, which is a derivative of the function that is being optimized.

* * * * *